(12) United States Patent
Halonen

(10) Patent No.: US 6,334,053 B1
(45) Date of Patent: Dec. 25, 2001

(54) PROCEDURE AND SYSTEM FOR PROVIDING AN ANSWERING SERVICE

(75) Inventor: Mikko Halonen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/663,574

(22) Filed: Sep. 12, 2000

Related U.S. Application Data

(63) Continuation of application No. PCT/FI99/00243, filed on Mar. 24, 1999.

(30) Foreign Application Priority Data

Mar. 25, 1998 (FI) .................................................. 980669 U

(51) Int. Cl.$^7$ ................................................ H04M 11/10
(52) U.S. Cl. .................... 455/412; 455/414; 455/466; 455/413; 455/461; 379/67.1; 379/81
(58) Field of Search ................................... 455/412, 445, 455/466, 414, 411, 413, 415, 425, 461, 462; 379/67.1, 229, 230, 71, 72, 81, 88.13, 88.15

(56) References Cited

U.S. PATENT DOCUMENTS

| 5,263,082 | 11/1993 | Kotake et al. . |
| 5,351,235 | 9/1994 | Lahtinen . |
| 5,764,731 | * 6/1998 | Yablon ................................. 379/88 |
| 5,878,397 | * 3/1999 | Stille et al. ......................... 704/466 |
| 6,229,878 | * 5/2001 | Moganti ............................. 379/67.1 |

FOREIGN PATENT DOCUMENTS

| 0 783 219 | 7/1997 | (EP) . |
| 0 920 227 | 6/1999 | (EP) . |
| 92/14329 | 8/1992 | (WO) . |
| WO 92/14329 | 8/1992 | (WO) . |
| 97/20442 | 6/1997 | (WO) . |
| 98/02005 | 1/1998 | (WO) . |

OTHER PUBLICATIONS

Finnish Search Report re: 980669.

\* cited by examiner

Primary Examiner—William Trost
Assistant Examiner—Marceau Milord
(74) Attorney, Agent, or Firm—Altera Law Group, LL

(57) ABSTRACT

Procedure for providing an answering service in a telecommunications network (1), which comprises a first short-message service center (2); a telephone network (3) using digital signalling and connected to the mobile communication network and a number of telecommunication terminals (4; $4^1$, $4^2$, . . . , $4^n$), which are compatible with the mobile communication and/or telephone network, in which procedure a response message is transmitted from a called party's telecommunications terminal to a calling party's telecommunication terminal after the calling party has tried to call the called party, who has activated an answering service in his/her telecommunication terminal. According to the invention, the response message is a predetermined short message. The telephone netowrk (3) isi connected to the first short-message service center (2) via a first telecommunication link (6). Subscriber type identification of the calling party is added to the response message and the response message is transmitted to the first short-message service center (2). The calling party's subscriber type is verified in the short-message service center, and, based on this, the response message is sent via an appropriate route to the called party.

17 Claims, 2 Drawing Sheets

PROCEDURE AND SYSTEM FOR PROVIDING AN ANSWERING SERVICE

This application is a con of PCT/FI99/00243 filed Mar. 24, 1999.

The present invention relates to a procedure as defined in the preamble of claim 1 and to a system as defined in the preamble of claim 13 for providing an answering service in a telecommunication network. In particular, the invention concerns the implementation of an answering service in a GSM network (GSM, Global System for Mobile Communications), in an ISDN network (ISDN, Integrated Digital Services Network) and between ISDN and GSM networks.

Telephone answering services are traditionally based on voice messages. The subscriber uses e.g. an answering machine which is connected to a telecommunication terminal or integrated with it. The answering machine comprises means, e.g. a magnetic tape, which the subscriber can use to store a spoken information message and which a person trying to reach the subscriber can use to leave a spoken paging message for the subscriber. As digital telecommunication networks are becoming more common, the same functions are nowadays generally implemented as services provided by the operator. This means that the subscriber orders from the operator a service by which, when the subscriber cannot be reached, any calls addressed to him/her are directed to a separate answering number. When someone is trying to call the subscriber, a standard information message provided by the operator or an information message dictated by the subscriber him/herself is reproduced for the caller. In addition, the caller can leave a paging message for the subscriber, who will receive the message when he/she calls his/her answering number to check any paging messages left for him/her.

A problem with prior-art answering services is that only one information message can be used at a time. If different messages are to be used in different situations, then they have to be recorded separately each time. Furthermore, present answering services are typically supplementary services liable to charge.

The object of the present invention is to disclose a new type of procedure to eliminate the drawbacks mentioned above.

A specific object of the invention is to disclose a new type of procedure and system that makes it possible to utilise the short-message service of a digital mobile communication network to implement a text message based answering service between the mobile communication network and the wired network as well as within the mobile communication network and the wired network.

As for the features characteristic of the invention, reference is made to the claims.

The system of the invention for providing an answering service in a telecommunication network comprises a mobile communication network, which comprises a first short-message service centre. The mobile communication network is preferably a GSM network provided with a short message transmission capability. The system also comprises a telephone network which uses digital signalling and is connected to the mobile communication network by means known in themselves in telephony. The telephone network is preferably an ISDN telephone network. Connected to the mobile communication network and to the telephone network are a number of telecommunication terminals, mobile stations and ISDN terminals, by means of which a response message is transmitted from a called party's terminal to a calling party's terminal after the calling party has tried to call the called party, who has activated an answering service in his/her terminal equipment.

According to the invention, the response message is a predetermined short message. Further, in the system according to the invention, a first short-message service centre is connected to the telephone network via a first telecommunication link.

According to the invention, during the generation of a response message, the message is provided with subscriber type identification of the calling party, which may be e.g. the calling party's subscriber number. Next, the response message is sent to the first short-message service centre. The calling party's subscriber type and possibly telephone number is/are verified in the short-message service centre and, based on that, the response message is sent to the calling party if the latter is a subscriber in the telephone network. If the calling party is a subscriber in the mobile communication network, then the short message definitions of the mobile communication network, known in themselves, will be used and the response message is sent via the short-message service centre to the calling party.

As compared with prior art, the present invention has the advantage that it makes it possible to send desired preselected short messages if, in certain situations, calls cannot be answered or if the line cannot be held. Several different messages can be stored in the terminal equipment for different situations, and from these messages the user can quickly and flexibly select a suitable one in each case as necessary. Naturally, it is also possible to write a new message. As the function is implemented in the terminal equipment, the user need not separately order a chargeable answering service from the operator, thus economising on costs. Besides, the fact that the message is in text form provides an advantage over a spoken message in certain situations. If a foreign language has to be used in the messages, then a written message will be more readily understood than a spoken message.

In a preferred embodiment of the present invention, in addition to a first short-message service centre, the system comprises one or more short-message service centres or devices or gateways corresponding to these, which are used to match the transmission path between the first short-message service centre and the telephone network. Such an arrangement may be needed to match the short-message service centre with the telephone network. The signalling used between the first short-message service centre and the telephone network is preferably DSS1—(DSS, Digital Signalling System) or ISUP—(ISUP, Integrated Services User Part) signalling.

Since setting up an ISDN call typically takes only a short time, it is possible to use the queueing property of the telephone network If the subscriber or the short-message service centre is busy at the beginning of the setup of a call addressed to them. The delay resulting from the queueing is so short that it does not significantly hamper the transmission of a response message, but instead it will eliminate "unnecessary" failures caused by a busy-signal in the transmission of short messages. The use of a queueing function like this is part of prior-art technology and it will therefore not be described here in detail.

If the response message is transmitted from an ISDN network to a GSM network or from a GSM network to an ISDN network, then the routing of the response message is taken care of by the first short-message service centre, which is connected to the mobile communication network. When a response message is sent from or to an ISDN terminal, then a call is set up between the terminal and the first short-message service centre to transmit the message to a second short-message service centre. The transmission of the response message is preferably effected using ISDN UUS signalling (UUS, User to User Signalling) by transfering the UUS information elements required for the transmission of the response message to the first short-message service centre or to the terminal during the ringing phase. However, no actual call is set up between the short-message service centre and the ISDN terminal.

In a preferred embodiment of the invention, receiver identification is transmitted in the Called Party Subaddress field.

In a preferred embodiment of the invention, the sending of the response message is delayed by a predetermined time interval. In this way, the user of the service will have time to answer the call if he/she wants to.

In addition, in a preferred embodiment of the procedure of the invention, a monitoring function is used to establish whether the message is successfully transmitted to the calling party and a notice of successful or unsuccessful transmission is given to the sender of the response message. In this way, the user of the service will be able to make sure that his/her message is delivered to the receiver.

In a preferred embodiment, the terminal equipment of the invention comprises means for the storage of predetermined response messages and for their selection for transmission. In addition, the wired-network ISDN terminal preferably supports the UUS1 supplementary service and the subaddressing supplementary service. Using the storage means, it is possible to create in the telecommunication terminal e.g. a menu control system that the user can use to select a predetermined response message to be sent.

In the following, the invention will be described in detail with reference to the attached drawing, wherein FIG. 1 represents a preferred system according to the invention;

A practical situation where the answering message service can be utilised could be e.g. as follows. The user is attending a meeting or is otherwise in a situation where he/she cannot answer any telephone calls, and the user has no answering machine and no call diversion or any corresponding service in use. Still, the user wants to tell the person calling him/her where he/she is at present, why he/she cannot answer and when he/she will be reachable again. The user has previously created different response messages and stored them behind an answering message function, the messages having a maximum length corresponding to that of a short message, such as: I am at a meeting, please call me again at 14.30. I am on a train and will arrive in Helsinki at 17.25. I will be reachable after the weekend. When the user goes to the meeting, he/she activates the answering message function on his/her telephone and selects a desired message previously stored in memory. He/she can also write a new one. After that, the user activates the silent mode. When someone calls the user from a GSM or ISDN telephone, the user can answer the call if necessary, or when a certain length of time, e.g. 10 seconds has elapsed, the response message selected by the user will be automatically sent as a short message from the user's terminal to the caller. Thus, the person calling the user will be informed as to why the user cannot answer the call and when he/she will be reachable again. The receiver's telephone number can be obtained e.g. by having the calling subscriber number transmitted in the setup message which is sent from the calling party's terminal equipment and received by the called party's terminal equipment during call setup.

Figure 1:
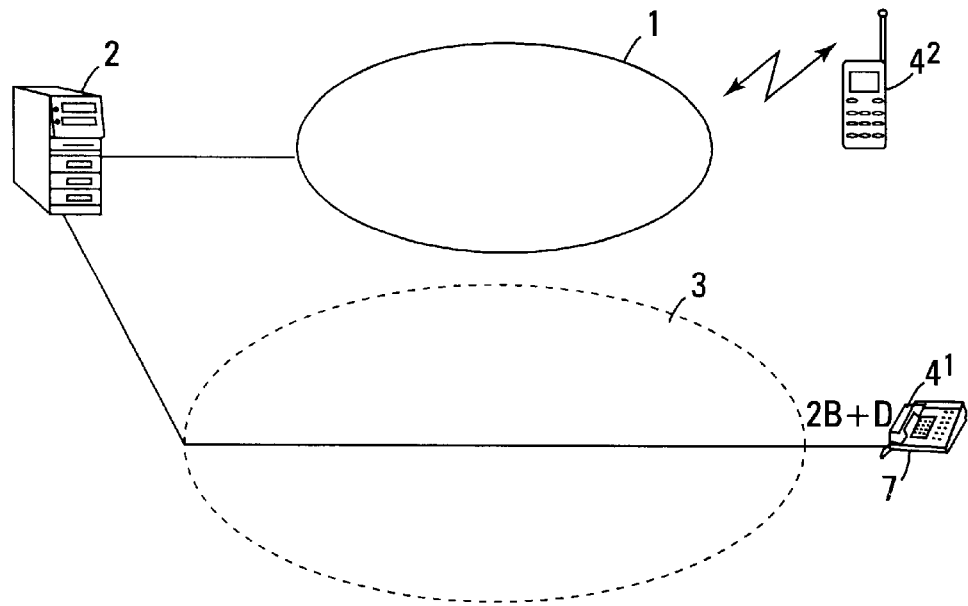

The system illustrated in FIG. 1, which is a simple embodiment of the present invention, comprises a mobile communication network 1 and a telephone network 3. The mobile communication network is a GSM network known in itself, in which users communicate using GSM mobile telephones $4^2$. The GSM standards define the transmission of short messages (SMS, Short Message Service). Using this service, users of the mobile communication network can send 160-character response messages in short-message format over the GSM network. The telephone network 3 comprises a local exchange LE (not shown) which supports ISDN signalling. Telecommunication terminal $4^1$ is connected to the local exchange LE via a basic-rate ISDN interface (2B+D). The GSM network comprises a first short-message service centre 2, which in itself is known in prior art and commonly used in the mobile communication network.

Figure 2:
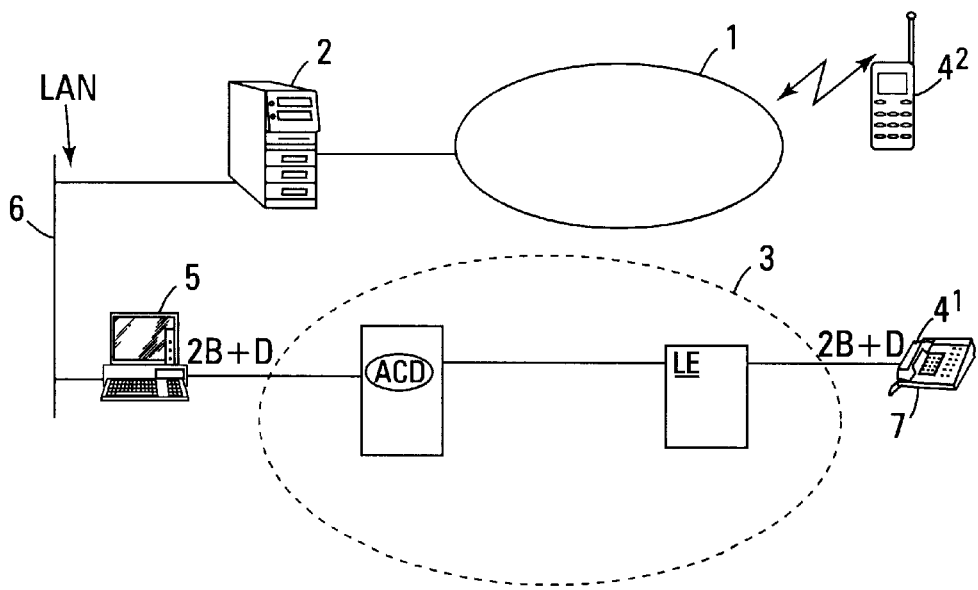
FIG. 2 represents another preferred system according to the invention.

The system presented in FIG. 2 additionally comprises a second short-message service centre 5. The short-message service centre 5 may be a computer or equivalent and it is generally connected to the telephone network via an ISDN basic rate interface. It is also possible to connect the second short-message service centre to the telephone network via an ISDN primary rate interface (30B+D) if a higher system capacity is required. The first and second short-message service centres 2, 5 are interconnected via a first telecommunication link 6, which may advantageously consist of a local area new LAN or a corresponding data network. Moreover, FIG. 2 diagrammatically depicts a call queuing function ACD in the telephone network, which allows a call setup request received from a telecommunication terminal $4^1$ to be placed in queue if the second short-message service centre 5 is busy. As the transmission of a response message in short message format only takes a short time, the user will hardly notice the delay resulting from the queueing.

According to the basic idea of the invention, short-message format response messages between the GSM network and the ISDN network are transferred via the first telecommunication link 6 between the short-message service centres. Thus, the transmission of response messages between the networks can be implemented using a separate data link. The first data link can be set up in the telephone network e.g. as an ISDN link. It is further to be noted that different alternatives for setting up the data link 6 are obvious to the skilled person.

Figure 3:
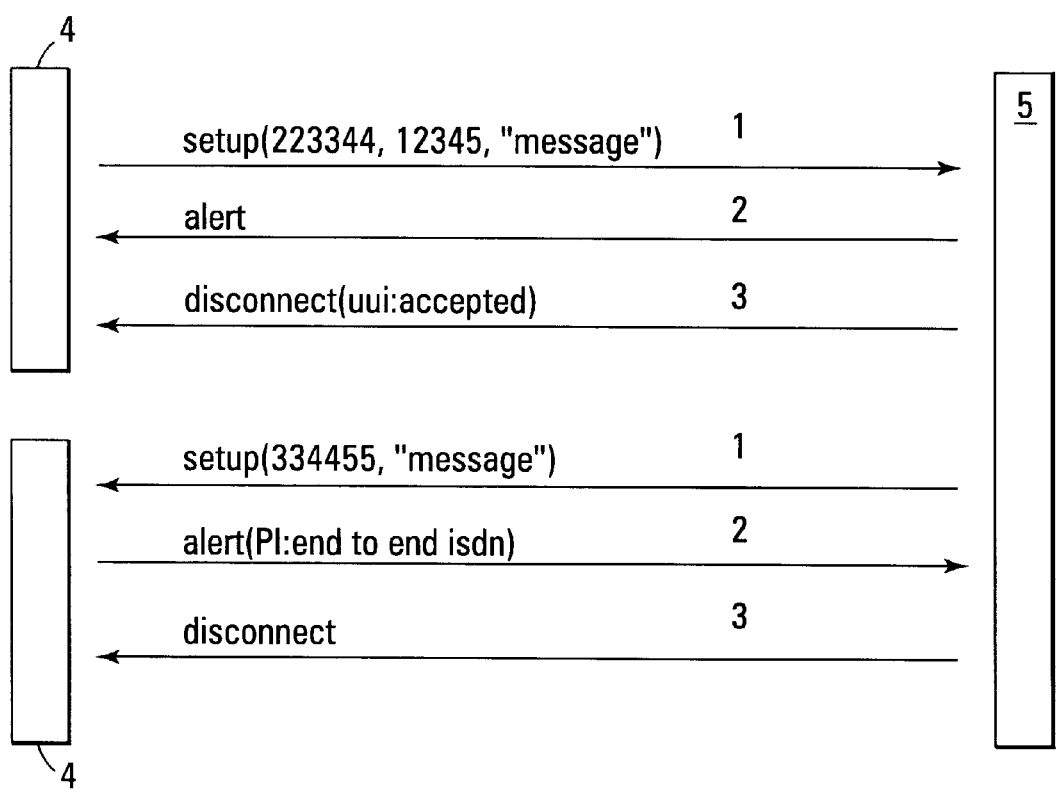
FIG. 3 represents the signalling between a telecommunication terminal and a second short-message service centre in a preferred embodiment of the invention.

FIG. 3 represents the call signalling between an ISDN terminal and the second short-message service centre when a short-message format response message is transmitted from an ISDN user either to another ISDN user or to the GSM network (case A) and when a short-message format response message is transmitted to an ISDN user from the GSM network or from another ISDN user (case B).

When a short-message format response message is sent from the ISDN network to the GSM network, the transmission of the message is implemented using e.g. User-to-User information elements. The messages can also be transmitted either as packet data or by some other standard transmission method. The ISDN terminal 4 generates a setup message containing a short-message service number 223344, the receiver's number 12345 and, in UUS information elements, the "message". The message is sent from the ISDN terminal to the first short-message service centre 2, arrow 1. The short-message service centre 2 may acknowledge receipt of the setup message, arrow 2. The acknowledgement is optional.

Once the short-message service centre 2 has received and processed the setup message, it sends to the ISDN terminal 4 a disconnect message containing information indicating that the UUS information elements sent by the user have been accepted.

When the response message arrives at the first short-message service centre 3, it is routed to the intended GSM subscriber as described in the GSM specifications. If the response message cannot be delivered to the receiver within a certain time, then the first short-message service centre 2 will notify the sender of the message about the failure. This notification is implemented using normal telephonic techniques.

A short-message format response message sent by a GSM subscriber is always first directed to the first short-message service centre 2, which, depending on the receiver's telephone number added to it, routes the response message either back to the GSM network or to the second short-message service centre 5 or starts setting up a call directly to the subscriber if the receiver is a subscriber in the ISDN telephone network. The second short-message service centre 5 sends the short-message format response message it has received from the GSM terminal to the ISDN network and takes care that the response message goes to the intended receiver. If the response message cannot be delivered within a prescribed length of time, then a short message indicating failure of transmission is sent to the GSM telephone.

A short-message format response message is sent from an ISDN terminal to another ISDN terminal using the UUS supplementary service. The response message is generated using e.g. means 7 added to the telecommunication terminal, selecting a predetermined response message from a menu. To send the response message, setup of a call to the first or second short-message service centre 2, 5 is started. However, no speech connection is set up, but the UUS information elements containing the short-message format response message are transmitted during the call setup and ringing stage. The receiver's number is transmitted in the Called Party Subaddress field as described above.

Correspondingly, the first or the second short-message service centre 2, 5 delivers the response message to the ISDN terminal by using the receiver's number 334455 as called party number and the subscriber number of the sender of the response message as calling party number. Here, too, the response message is delivered to the receiver in UUS information elements during the call setup and ringing stage.

The ISDN terminal preferably supports the UUS and subaddressing (SUB) supplementary services. In this example, the user interface of the telecommunication terminal is presented as being implemented using menu control 7, which allows the user to select the response message to be sent.

The invention is not restricted to the examples of its embodiments described above, but many variations are possible within the scope of the inventive idea defined in the claims.

What is claimed is:

1. Procedure for providing an answering service in a telecommunication network comprising a mobile communication network (1), which comprises a first short-message service centre (2); a telephone network (3) using digital signalling and connected to the mobile communication network; and a number of telecommunication terminals (4; 4$^1$, 4$^2$, . . . , 4$^n$), which are compatible with the mobile communication and/or telephone network, in which procedure a response message is transmitted from a called party's telecommunication terminal to a calling party's telecommunication terminal after the calling party has tried to call the called party, who has activated the answering service in his/her telecommunication terminal, characterised in that the response message is a predetermined short message;
the telephone network (3) is connected to the first short-message service centre (2) via a first telecommunication link (6);
subscriber type identification of the calling party is added to the response message;
the response message is transmitted to the first short-message service centre;
the calling party's subscriber type is verified in the short-message service centre; and
if the calling party is a subscriber in the telephone network, then the setup of a call to the calling party is started and the response message is sent to the calling party during the call setup procedure;
if the calling party is a subscriber in the mobile communication network, then the response message is sent to the calling party via the first short-message service centre in accordance with the short message definitions of the mobile communication network known in themselves.

2. Procedure as defined in claim 1, characterised in that the telephone network is an ISDN network or equivalent and the mobile communication network is a GSM network or equivalent.

3. Procedure as defined in claim 1, characterised in that a number of short-message service centres (5) are connected to the telephone network (3) and these are connected to the first short-message service centre.

4. Procedure as defined in claim 1, characterised in that the routing of the response message between the mobile communication network and the telephone network is effected in the first short-message service centre.

5. Procedure as defined in claim 1, characterised in that the response message is sent from an ISDN terminal by setting up a call between the sending ISDN terminal and the first short-message service centre (2) in order to transmit the response message to a second short-message service centre.

6. Procedure as defined in claim 1, characterised in that the response message is sent to an ISDN terminal by setting up a call between the receiving ISDN terminal and a second short-message service centre (2) in order to transmit the response message to the short-message service centre, from where it is to be routed further.

7. Procedure as defined in claim 1, characterised in that the transmission of the response message in the ISDN network is implemented using UUS signalling in such manner that, when a response message is sent from an ISDN terminal, the UUS information elements required for the transmission of the response message are transferred to the short-message service centre (2) and further to the calling party.

8. Procedure as defined in claim 1, characterised in that the calling party identification is transmitted in the called party subaddress field.

9. Procedure as defined in claim 1, characterised in that the sending of the response message is delayed by a time interval of predetermined length.

10. Procedure as defined in claim 1, characterised in that a monitoring function is used to establish whether the message is successfully transmitted to the calling party and, if the transmission fails, a corresponding notice is given to the called party.

11. Procedure as defined in claim 1, characterised in that a monitoring function is used to establish whether the message is successfully transmitted to the calling party and, when the transmission is successful, a corresponding notice is given to the called party.

12. Procedure as defined in claim 1, characterised in that the call queueing capability of the telephone network is used if the called party in the telephone network or the first short-message service centre (2) is busy when call setup is started.

13. System for providing an answering service in a telecommunication network comprising a mobile communication network (1), which comprises a first short-message service centre (2); a telephone network (3) using digital signalling and connected to the mobile communication network; and a number of telecommunication terminals (4; $4^1$, $4^2$, ..., $4^n$), which are compatible with the mobile communication and/or telephone network, in which system a response message is transmitted from a called party's telecommunication terminal to a calling party's telecommunication terminal after the calling party has tried to call the called party, who has activated the answering service in his/her telecommunication terminal, characterised in that the response message is a predetermined short message; and the telephone network (3) is connected to the first short-message service centre (2) via a first telecommunication link (6).

14. System as defined in claim 13, characterised in that the telephone network is an ISDN network or equivalent and the mobile communication network is a GSM network or equivalent.

15. System as defined in claim 13, characterised in that the telecommunication network comprises a number of short-message service centres (5) which are connected to the first short-message service centre.

16. System as defined in claim 13, characterised in that digital signalling, such as DSS1, ISUP or equivalent signalling is used between the telephone network (3) and the first short-message service centre.

17. System as defined in claims 13, characterised in that the telecommunication terminal (4) comprises means (7) for the storage and selection of response messages to be sent.

* * * * *